: # 3,236,658
FRUCTOSE-CONTAINING FROZEN DESSERT

Lawrence L. Little, Louisville, Ky., assignor to Dawe's Laboratories, Inc., Chicago, Ill., a corporation of Illinois
No Drawing. Filed June 11, 1962, Ser. No. 201,318
11 Claims. (Cl. 99—136)

This invention relates to the preparation of a frozen dessert, such as ice cream, ice milk and the like, and it relates to food products of the type described which have lower calorific values; which can be used by diabetics without upset of insulin balance; and which embody good texture and taste which is characteristic of such frozen desserts.

In the preparation of frozen desserts, sucrose is generally employed as the sweetener and as a freezing point depressant to provide the desired texture and taste to the frozen product. For this purpose, it has been the practice to make use of an amount of sucrose in the range of about 15% or more by weight of the ingredients. There are a number of objections to such use of sucrose, especially in such high concentrations, in frozen desserts. One such objection resides in the high calorific value introduced by this large amount of sucrose in the frozen food product whereby the product becomes unsuitable for use by persons on diets. Another objection resides in the need of insulin to consume the sucrose.

Diabetics are deficient, to varying degrees, in the ability to produce insulin and, unless insulin is present, the glucose cannot be utilized and the body is thereby deprived of a primary source of food. Further, unused glucose builds up to high levels in the blood and spills over into the urine through the kidneys. Under such conditions, fats are burned as a primary source of fuel. When fats are burned along with carbohydrates under normal conditions of metabolism, they are oxidized substantially completely to $CO_2$ and water. When the fats are utilized alone or with an insufficient amount of carbohydrate fuel, combustion of the fats is incomplete and ketone by-products are formed. These accumulate and produce serious toxic effects in the body. This sometimes leads to atherosclerosis and the deposit of by-products onto the interior walls of blood vessels. In severe diabetics, the protein may also be utilized as fuel at the expense of the body's vital tissue-building and repair material.

Thus it is desirable to produce a frozen dessert in which the sucrose is markedly reduced, and preferably completely eliminated but without loss of sweetness and taste and without noticeable change in texture.

Attempts have been made to replace sucrose with corn syrup but for every part of sucrose replaced, it is necessary to make use of at least two parts by weight of corn syrup; even then, it has only been possible to reduce the sucrose by as little as 2%, in order to maintain the desired sweetness. This has resulted in a frozen food product which still contains 13% sucrose and 4% corn syrup, thus actually increasing the sugar solids by 2%.

Attempts have also been made to substitute sorbitol for sucrose. While sorbitol is a freezing point depressant, it lacks sweetness and it becomes necessary to make use of chemical sweeteners such as saccharin, in combination with the sorbitol in the attempt to achieve the desired effect. Aside from the necessity to make use of such chemical sweeteners, which are not the full equivalent of sucrose in taste, sorbitol is a laxative and the products, therefore, require labels warning of laxative effects, and its use does not have the general approval of the medical profession.

It is an object of this invention to produce a frozen dessert which can be used by people on diets and by diabetics and which, for all practical purposes, has as good a texture and taste as corresponding desserts produced with the usual amount of sucrose but in which the sucrose is not present or, if present, to a considerably less degree.

More specifically, it is an object of this invention to produce a frozen food product of the type described which has lower calorific value by comparison with such frozen food products embodying sucrose; which embodies ingredients for introducing the desired sweetness which do not require insulin for assimilation; which has good taste and sufficient sweetness; which is characterized by good stability and texture, and which can be produced with various flavors as ice cream or ice milk.

These and other objects and advantages of this invention can be achieved in an ice cream formulation represented by the following recipe.

EXAMPLE I

| Ingredients: | Percent by weight |
| --- | --- |
| Butterfat | 10 |
| Milk solids not fat | 12 |
| Fructose | 9 |
| Sodium caseinate | 1 |
| Mono and diglycerides | .15 |
| Carboxymethyl cellulose | .042 |
| Irish moss extract | .015 |
| Locust bean gum | .08 |
| Calcium sulfate | .084 |
| Flavoring | 1 |
| Water | Remainder |

The foregoing ingredients are combined in the usual manner for ice cream manufacture and aerated to produce a frozen ice cream dessert having 9.2 pounds of the above mix per gallon; 4.6 pounds of ice cream per gallon and a maximum of about 100% over-run. The ice cream product will have about 187 calories per 100 grams or about 993 calories per quart.

It will be noted that sucrose is completely absent from the foregoing mix, and it will be apparent further from the above recipe that no use is made of a chemical sweetener. An important concept embodied in the foregoing formulation and in the practice of this invention resides in the use of fructose in combination with the other ingredients to provide for the desired sweetness and taste; the desired texture and stability; the desired reduction in calories, and the desired combination of ingredients which can be used by diabetics without upset of insulin balance.

Fructose is a monosaccharide which can pass through the tissues into the body fluids more readily than sucrose, which is a disaccharide. Further, fructose is oxidized by a different enzyme system by comparison with sucrose and, therefore, fructose is subject to utilization by the body in the absence of insulin, whereas sucrose is not. Fructose, when used in such frozen food products, does not require insulin for assimilation or digestion and is thus well adapted for use in foods for diabetics.

Fructose is characterized by a sweetness that is considerably greater than that available from sucrose such that the desired sweetness and taste can be developed in the frozen food products of this invention when fructose is present in the amount within the range of from 8–13 percent by weight and preferably 8–10 percent by weight of the formulation for preparation of the frozen dessert or about 60 percent of the weight of sucrose that would otherwise be required. The desired depression in the freezing point of the frozen dessert is attained when fructose is present in an amount within the range of 8–13%, such that the desired texture, taste and sweetness is achieved with a marked reduction in calories in the frozen dessert and without the necessity for the supply of insulin by the body for digestion.

It is desirable to effect other modifications in the formulation of a frozen dessert embodying fructose to develop the full sweetness of the fructose. Thus, the invention contemplates the utilization of fructose in the frozen dessert with the combination of other ingredients for improvement in taste, texture and value, without increase in calories and without increasing the requirement for insulin for digestion.

In the formulation of a frozen dessert with fructose, use is made of additional milk solids not fat (MSNF), which are believed to react with the fructose to increase sweetness whereby a lesser amount of fructose is required and which operates also to minimize acrid bitterness at the higher levels of fructose thereby materially to improve the taste. For this purpose, it is desirable to make use of MSNF in the formulation in an amount within the range of from 8–12% and preferably within the range of 10–11%.

In the ice cream, ice milk or other frozen dessert formulated in accordance with this invention with fructose, it is desirable to make use of the fructose also in combination with further ingredients, including an emulsifier in the form of a mono or di glyceride; a stabilizer system selected of such materials as gelatin, carboxymethyl cellulose, locust bean gum, guar gum, Irish moss and alginates, preferably with a number of such stabilizers in combination, and with a caseinate such as sodium caseinate.

As the emulsifier, use can be made of monor or di glycerides, and of polyoxyethylene derivatives of sorbitol fatty acid esters, such as sorbitol monolaurate polyoxyethylene derivatives (Tween-20, Atlas Powder Company), sorbitol monopalmitate polyoxyethylene derivatives (Tween-40), sorbitol monostearin polyoxyethylene derivatives (Tween-60), sorbitol tristearin polyoxyethylene derivatives (Tween-65), sorbitol monoleate polyoxyethylene derivatives (Tween-80). Ordinarily only 0.05 to 0.12% by weight of emulsifier is employed in frozen dessert of the type described. However, in the system of this invention, emulsifiers of the type described are required to be employed in an amount greater than 0.12% by weight in the formulation up to the maximum permitted by federal regulations, and preferably in an amount within the range of 0.15 to 0.2% by weight.

While it is possible to make use of both a single stabilizer in amounts corresponding to about 0.5% by weight for gelatin, 0.15% by weight for carboxymethyl cellulose, 0.15% by weight for locust bean gum, 0.15% by weight for guar gum, 0.03 to 0.08% by weight for Irish moss and 0.1 to 0.3% by weight for sodium alginate or a glycol alginate, such as propylene glycol alginate; it is desirable to make use of combination stabilizers in the amount described in combination with fructose in the frozen dessert, such as for example, as the combination of carboxymethyl cellulose, Irish moss and locust bean gum. When use is made of a blend of the type described, the total of the stabilizer employed in the formulation should be within the range of 0.1 to 0.2%. This is about ½ the amount normally required in ice cream or ice milk. The same ratio is applicable with respect to gelatin, alginates and other materials listed above as suitable alone or in combination in the fructose system of this invention.

The caseinate in the form of sodium or calcium caseinate or mixtures thereof should be employed in an amount less than 2% by weight in the formulation, and preferably in an amount of ½ to 2% by weight.

The calcium sulfate functions in the system to prevent separation of the whey. Calcium sulfate is not essential and the frozen dessert can be formulated without it.

The following are further examples of formulations embodying the practice of this invention, in the preparation of ice cream and ice milk.

EXAMPLE II

*Chocolate ice milk*

| Ingredients: | Percent by weight |
|---|---|
| Butterfat | 4.0 |
| MSNF | 11.0 |
| Sodium caseinate | 1.0 |
| Fructose | 11.5 |
| Low fat cocoa | 3.0 |
| Mono and diglycerides | 0.2 |
| Carboxymethyl cellulose | 0.075 |
| Irish moss extract | 0.015 |
| Locust bean gum | 0.12 |
| Calcium sulfate | 0.09 |
| Water | 69.0 |

EXAMPLE III

*Ice milk*

| Ingredients: | |
|---|---|
| Butterfat | 4.0 |
| MSNF | 12.0 |
| Sodium caseinate | 2.0 |
| Fructose | 9.0 |
| Sorbitol monolaurate polyoxyethylene derivatives | 0.2 |
| Carboxymethyl cellulose (high viscosity) | 0.075 |
| Irish moss extract | 0.015 |
| Guar gum | 0.12 |
| Calcium sulfate | 0.09 |
| Flavoring | 1.0 |
| Water | 71.5 |

EXAMPLE IV

*Chocolate ice cream*

| Ingredients: | |
|---|---|
| Butterfat | 10.0 |
| MSNF | 12.0 |
| Fructose | 11.0 |
| Low fat cocoa | 3.0 |
| Stabilizers (sodium alginate, Irish moss) | 0.5 |
| Water | 63.5 |

The formulas of Examples II to IV are incorporated in amounts to provide from 9 to 9.2 pounds per gallon of frozen dessert, with an over-run ranging from 80–110%

In the foregoing examples, the fructose is incorporated as syrup containing 65% fructose, but it may be incorporated instead as a syrup containing 40–85% fructose or as fructose in dry form such as in crystalline or powder form. The other ingredients are stirred into the syrup before freezing and aerating to produce the frozen dessert with the desired over-run.

It will be apparent from the foregoing that this invention provides a frozen dessert having appeal to various groups as follows: (1) When people who are overweight and should, therefore, restrict their total caloric intake; (2) Diabetics who may or may not have to restrict their caloric intake but who must maintain a careful balance between carbohydrates and insulin administered; (3) Patients who should restrict their total caloric intake and also greatly restrict their consumption of fats.

The ice milk formulation embodying the practice of this invention, such as represented in Examples II and III, can be filled and the ice cream formulations can be filled and the ice cream formulations can be improved for reduction of cholesterol content by the use of polyunsaturated vegetable oils for the butterfat. For this purpose, use can be made of highly unsaturated safflower seed oil or corn oil, soy oil or mixtures thereof, as illustrated by the following example.

EXAMPLE V

Ingredients: Percent by weight
- Safflower seed oil _____ 10.0
- MSNF _____ 12.0
- Fructose _____ 9.0
- Sodium caseinate _____ 1.0
- Emulsifier (mono, diglycerides) _____ 0.15
- Irish moss _____ 0.04
- Sodium alginate _____ 0.015
- Locust bean gum _____ 0.08
- Flavoring _____ 1.0
- Water _____ 66.715

EXAMPLE VI

Ingredients: Percent by weight
- Corn oil _____ 5.0
- Safflower seed oil _____ 5.0
- Fructose _____ 11.0
- Low fat cocoa _____ 3.0
- Sodium caseinate _____ 1.0
- Gelatin _____ 0.5
- Water _____ 74.5

The foregoing formulation is formed into an ice cream as in the previous Examples I and IV.

It will be understood that changes may be made in the details of formulation and preparation without departing from the spirit of the invention.

I claim:

1. A frozen dessert consisting essentially of fructose as the sweeting agent and which functions as a freezing point depressant, and the combination with the fructose of milk solids not fat, a stabilizer, emulsifiers and a caseinate, wherein the materials are present in the ratio of 8-10 percent by weight fructose, 8-12 percent by weight milk solids not fat, more than 0.12 percent by weight emulsifier, 0.1-0.5 percent by weight stabilizer and less than 2 percent by weight caseinate with the balance water.

2. A frozen dessert as claimed in claim 1 in which the stabilizer is a sorbitol fatty acid ester polyoxyethylene derivative.

3. A frozen dessert as claimed in claim 1 in which the stabilizer is selected from the group consisting of gelatin, carboxymethylcellulose, locust bean gum, guar gum, Irish moss, alginate and mixtures thereof.

4. A frozen dessert as claimed in claim 1 in which the stabilizer is selected from the group consisting of gelatin, carboxymethylcellulose, locust bean gum, guar gum, Irish moss, alginate and mixtures thereof, wherein the particular stabilizer is present in the composition in the ratio of about 0.5 percent by weight gelatin, 0.15 percent by weight carboxymethylcellulose, 0.15 percent by weight locust bean gum, 0.15 percent by weight guar gum, 0.03-0.08 percent by weight Irish moss, and 0.1-0.3 percent by weight alginate with the balance comprising water.

5. A frozen dessert as claimed in claim 1 in which the caseinate is selected from the group consisting of sodium caseinate and a glycol caseinate, and wherein the caseinate is present in the ratio of ½-2 percent by weight.

6. A frozen dessert consisting essentially of fructose as the sweetening agent and which functions as a freezing point depressant, and the combination with the fructose of milk solids not fat, a stabilizer, emulsifiers, and caseinate, in which the materials are present in the ratio of 8-13 percent by weight fructose, 10-11 percent by weight milk solids not fat, 0.15-0.2 percent by weight emulsifier, 0.1-0.2 percent by weight stabilizer and 0.5-2 percent by weight caseinate with the balance water.

7. A frozen dessert consisting essentially of fructose as the sweetening agent and which functions as a freezing point depressant, and the combination with the fructose of milk solids not fat, a stabilizer, emulsifiers, a caseinate, a fat and a flavoring agent, in which the materials are present in the ratio of 8-10 percent by weight fructose, 8-12 percent by weight milk solids not fat, more than 0.12 percent by weight emulsifier, 0.1-0.2 percent by weight stabilizer, less than 2 percent by weight caseinate, and an amount of fat within the range of up to 4 percent by weight for ice milk and up to 12 percent by weight for ice cream with the balance water.

8. A frozen dessert consisting essentially of fructose as the sweetening agent and which functions as a freezing point depressant, and the combination with the fructose of milk solids not fat, a stabilizer, emulsifiers, a caseinate, a fat and a flavoring agent, in which the materials are present in the ratio of 8-13 percent by weight fructose, 8-12 percent by weight milk solids not fat, more than 0.12 percent by weight emulsifier, 0.1-0.2 percent by weight stabilizer, less than 2 percent by weight caseinate, and an amount of fat within the range of up to 4 percent by weight for ice milk and up to 12 percent by weight for ice cream with the balance water.

9. A frozen dessert as claimed in claim 8 in which the fat is a butter fat.

10. A frozen dessert as claimed in claim 8 in which the fat is a polyunsaturated vegetable oil.

11. A frozen dessert as claimed in claim 8 in which the fat is safflower seed oil.

References Cited by the Examiner

UNITED STATES PATENTS

| | | | |
|---|---|---|---|
| 1,598,033 | 8/1926 | Zoller | 99—136 |
| 2,097,231 | 10/1937 | Lucas | 99—136 |
| 2,290,214 | 7/1942 | Smith | 99—136 |
| 2,493,324 | 1/1950 | Steiner et al. | 99—136 |
| 2,602,749 | 7/1952 | Brown | 99—136 |
| 2,782,123 | 2/1957 | Rubin | 99—141 |
| 3,003,882 | 10/1961 | Peat | 99—136 |

OTHER REFERENCES

Ice Cream Trade Journal, December 1930, pages 34 and 36.

The Ice Cream Review, January 1940, pp. 35 and 36.

University of Illinois, Agricultural Experimental Station, Urbana, Illinois, April 1918, Circular 219, entitled "Conserving Sugar in Ice Cream Manufacture" (2 pages).

Tracy: "New Sweetening Agents for Ice Cream," Ice Cream Review, January 1940, pp. 35 and 36.

A. LOUIS MONACELL, *Primary Examiner.*

ABRAHAM H. WINKELSTEIN, *Examiner.*